US012804425B2

(12) United States Patent
Vasas et al.

(10) Patent No.: US 12,804,425 B2
(45) Date of Patent: Nov. 17, 2026

(54) COMBINED HIGH-ALTITUDE AND TERRESTRIAL OVERSHOOT DETECTION

(71) Applicant: Telefonaktiebolaget LM Ericsson (publ), Stockholm (SE)

(72) Inventors: Róbert Vasas, Budapest (HU); Alexander Biro, Budapest (HU); Attila Báder, Paty (HU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 246 days.

(21) Appl. No.: 18/727,792

(22) PCT Filed: Jan. 10, 2022

(86) PCT No.: PCT/IB2022/050143
§ 371 (c)(1),
(2) Date: Jul. 10, 2024

(87) PCT Pub. No.: WO2023/131818
PCT Pub. Date: Jul. 13, 2023

(65) Prior Publication Data
US 2025/0097731 A1 Mar. 20, 2025

(51) Int. Cl.
*H04W 24/02* (2009.01)
*H04W 24/10* (2009.01)
*H04W 64/00* (2009.01)
*H04W 84/06* (2009.01)

(52) U.S. Cl.
CPC ........... *H04W 24/02* (2013.01); *H04W 24/10* (2013.01); *H04W 64/00* (2013.01); *H04W 84/06* (2013.01)

(58) Field of Classification Search
None
See application file for complete search history.

(56) References Cited

U.S. PATENT DOCUMENTS

| | | | |
|---|---|---|---|
| 10,251,102 B2 | 4/2019 | Levinkron et al. | |
| 2014/0162682 A1 | 6/2014 | Tafreshi et al. | |
| 2016/0165472 A1 | 6/2016 | Gopalakrishnan et al. | |
| 2019/0246292 A1 | 8/2019 | Shekalim et al. | |
| 2020/0413459 A1* | 12/2020 | Yoon | H04W 52/40 |

(Continued)

OTHER PUBLICATIONS

International Search Report and Written Opinion dated Aug. 31, 2022 for International Application No. PCT/IB2022/050143 filed Jan. 10, 2022, consisting of 18 pages.

(Continued)

*Primary Examiner* — Anh Ngoc M Nguyen
(74) *Attorney, Agent, or Firm* — Weisberg I.P. Law, P.A.

(57) ABSTRACT

An analytics system performs a high-altitude overshoot detection procedure and a terrestrial overshoot detection procedure. The analytics system detects a plurality of overshooting events occurring within a communication network. Each overshooting event is detected by either the high-altitude overshoot detection procedure or the terrestrial overshoot detection procedure. Responsive to a base station within the communication network being associated with more than a threshold number of the overshooting events, the analytics system configures the base station to use a previous antenna tilt that produced overshooting events at a lower rate relative to a current antenna tilt of the base station.

20 Claims, 9 Drawing Sheets

(56) References Cited

U.S. PATENT DOCUMENTS

2023/0022247 A1* 1/2023 Lundén ................ H04W 16/18

OTHER PUBLICATIONS

3GPP TSG-RAN WG2 Meeting #99 R2-1708544; Title: Analysis and Simulation of Handover Issues for Drones; Agenda Item: 9.4.4; Source: Huawei, HiSilicon; Document for: Discussion; Date and Location: Aug. 21-25, 2017, Berlin, Germany, consisting of 9 pages.
3GPP TR 36.777 V15.0.0; 3rd Generation Partnership Project; Technical Specification Group Radio Access Network; Study on Enhanced LTE Support for Aerial Vehicles (Release 15); Dec. 2017, consisting of 89 pages.
Ericsson; Expert Analytics; Ericsson portfolio . . . Analytics and Assurance; Ericsson; 1994-2021, consisting of 2 pages.
3GPP TS 36.331 V14.4.0; 3rd Generation Partnership Project; Technical Specification Group Radio Access Network; Evolved Universal Terrestrial Radio Access (E-UTRA); Radio Resource Control (RRC); Protocol specification (Release 14); Sep. 2017, consisting of 753 pages.

* cited by examiner

COMBINED HIGH-ALTITUDE AND TERRESTRIAL OVERSHOOT DETECTION

CROSS-REFERENCE TO RELATED APPLICATIONS

This application is a Submission Under 35 U.S.C. § 371 for U.S. National Stage Patent Application of International Application Number: PCT/IB2022/050143, filed Jan. 10, 2022 entitled "COMBINED HIGH-ALTITUDE AND TERRESTRIAL OVERSHOOT DETECTION," the entirety of which is incorporated herein by reference.

TECHNICAL FIELD

Embodiments of the present disclosure generally relate to the technical field of wireless communication, and more particularly to the detection of overshoot conditions within a wireless communication network.

BACKGROUND

Appropriate cell planning of mobile networks is typically one of the key factors in providing good service to customers and users of a mobile network operator. Often, a primary goal of cell planning is to provide good coverage so that services can be accessed throughout the coverage area and can support mobility. Once coverage is appropriate, a secondary goal of radio planning and optimization is often to reduce interference, which improves service quality.

One of many various issues in cell planning is a problem known as overshooting, which can result in increased interference and, in some cases, unwanted handover decisions. Overshooting is traditionally caused by a signal from a long-distance cell having an inappropriate antenna direction or other setting. The main cause of this phenomenon is typically due to bad antenna parameters settings, high power transmission, too-high antenna position, or suboptimal surrounding terrain. To optimize these parameters, overshoot should be detected and eliminated by radio optimization.

Automatic/automated overshoot detection can be done in several different ways. Often, it is important to decide what distance corresponds to an overshooting scenario. That is, it is often important to determine what the overshoot threshold is for a certain site and/or cell.

Traditional network analytics systems have had limited usefulness at addressing these problems. Traditional network analytics systems are typically part of the network management domain and are more commonly used to monitor and analyze service and network quality at session level in mobile networks. Network analytics systems are increasingly being used for automatic network operation as well to improve network performance e.g., by eliminating network issues through closed loop techniques. These systems traditionally monitor Key Performance Indicators (KPIs), which are based on node and network events and counters. KPIs are aggregated in time and often for a particular node or other dimensions (e.g., device type, service provider, or network dimensions, like cell, network node, etc.). While KPIs can indicate node or network failures, usually they are not detailed enough for troubleshooting purposes, and are not typically suitable for identifying end-to-end (e2e), user-perceived, service quality issues.

More advanced analytics systems, such as Ericsson Expert Analytics (EEA), collect and correlate elementary network events as well as e2e service quality metrics and computing user level e2e KPIs based on the available data.

The per subscriber, per session, and network KPIs can easily be aggregated for different network and time dimensions. These types of solutions are suitable for session-based troubleshooting and analysis of network issues and their monitored network domains can include both radio and core networks. That said, overshoot detection presents special challenges that even advanced analytics systems have yet to fully resolve.

Some approaches to specifically resolving overshooting scenarios have been previously proposed. For example, some approaches use the number of neighbors and the median site-to-site distance between cells to limit and rank an overshooting cell candidate list. Other options more focus on measurements (e.g., timing advances) between User Equipment (UEs) and radio cells. Yet other examples, use machine learning algorithms to detect overshooting cells by providing some initial training data.

However, these approaches were devised with a traditional mobile network in mind. In traditional mobile networks, the radio network is placed at a higher altitude than the terrestrial network and the radio network directs its main antenna beams at the terrestrial level. This arrangement often provides good line-of-sight radio paths without shielding and, in many cases, the strongest radio signal is related to antenna side beams. The signal strength and interference pattern also strongly vary at different altitudes.

In contrast to these traditional networks, modern UEs cannot always be expected to be at the terrestrial level. Many modern UEs are comprised in aerial systems (e.g., Above Ground Level (AGL) Unmanned Aerial Systems (UASs), sometimes referred to as aerial drones). In recognition of this shift, Third Generation Partnership Project (3GPP) specifications have begun to introduce extensions in support of such drones. Example of such extensions include reporting procedures for when UEs cross certain altitude thresholds, new interference detection mechanisms based on measurement reporting triggered when a configured number of cells fulfil certain triggering criteria, power control enhancements including UE-specific pathloss compensation factors and extended range of nominal target received power, and the ability to send flight path information from the UE to the network. Notwithstanding, overshoot detection remains a challenging problem even for traditional networks, let alone for more modern networks in which UEs may be at a wider variety of altitudes.

SUMMARY

Embodiments of the present disclosure are generally directed to enhancing wireless communication networks that traditionally have been optimized for UEs standing or moving at terrestrial level. Thus, particular embodiments address a need for improvements to known overshoot detection techniques which currently do not adequately detect overshoot at high altitudes, much less resolve overshoot at both the terrestrial level and at higher altitudes.

Given that commercial aerial drone applications and services (for example) are becoming increasingly common and important, embodiments of the present disclosure are generally directed to tuning cellular networks to provide better support for aerial systems, especially at altitudes above 100 m. Among other things, the present embodiments may enable reliable, low latency, and wideband user and control plane channels that are supported by 3GPP standards to be provided to aerial UEs. In some embodiments, radio optimization (e.g., including overshoot detection and elimination) is performed to improve drone support while maintaining the performance of the radio environment for terrestrial UEs. Further, since mobility support can be quite important for drones, particular embodiments improve or enable mobility management and robust handover at higher altitudes.

Embodiments of the present disclosure include a method implemented by an analytics system. The method comprises performing a high-altitude overshoot detection procedure and a terrestrial overshoot detection procedure. The method further comprises detecting a plurality of overshooting events occurring within a communication network. Each overshooting event is detected by either the high-altitude overshoot detection procedure or the terrestrial overshoot detection procedure. The method further comprises, responsive to a base station within the communication network being associated with more than a threshold number of the overshooting events, configuring the base station to use a previous antenna tilt that produced overshooting events at a lower rate relative to a current antenna tilt of the base station.

In some embodiments, performing the terrestrial overshoot detection procedure comprises calculating a distance threshold based on a site-to-site distance between the base station and each of a plurality of other base stations neighboring the base station. Detecting the plurality of overshooting events comprises detecting, by the terrestrial overshooting procedure, an overshooting event associated with the base station. Further, detecting, by the terrestrial overshooting procedure, the overshooting event associated with the base station comprises detecting that a user equipment has performed a handover from the base station in excess of the distance threshold. In some such embodiments, calculating the distance threshold comprises applying a weighting factor to the site-to-site distances based on a geographic density of the base station and the other base stations.

In some embodiments, calculating the distance threshold comprises calculating an average or mean of the site-to-site distances. In some such embodiments, calculating the distance threshold further comprises calculating the distance threshold further based on a single-linkage distance between an outlier base station cluster and another base station cluster, the outlier base station cluster comprising the base station and the other base stations. The method, in some embodiments, additionally or alternatively comprises generating an error report indicating a problem with one or more of the site-to-site distances.

In some embodiments, detecting the plurality of overshooting events comprises detecting, by the high-altitude overshoot detection procedure, an overshooting event associated with the base station. Detecting, by the high-altitude overshoot detection procedure, the overshooting event associated with the base station comprises receiving a measurement report from an aerial user equipment that has exceeded a height threshold configured by the communication network. The measurement report indicates a position of the aerial user equipment and a plurality of base stations detected by the aerial user equipment at the position. The base station is comprised in the plurality of base stations and is farther from the aerial user equipment than at least two other of the base stations. In some such embodiments, detecting, by the high-altitude overshoot detection procedure, the overshooting event associated with the base station further comprises determining from a base station location database that the base station is farther from the aerial user equipment than the at least two other base stations. Additionally or alternatively, in some embodiments, detecting the plurality of overshooting events comprises detecting, by the high-altitude overshoot detection procedure, a further overshooting event associated with a further base station comprised in the plurality of base stations indicated by the measurement report. Detecting, by the high-altitude overshoot detection procedure, the further overshooting event associated with the further base station comprises determining that the further base station is farther from the aerial user equipment than the at least two other base stations.

In some embodiments, the method further comprises generating a report identifying base stations causing the overshooting events occurring within the communication network.

In some embodiments, the method further comprises identifying, from historical data, the previous antenna tilt of the base station that produced the overshooting events associated with the base station at the lower rate.

Other embodiments include an analytics system. The analytics system comprises processing circuitry and memory circuitry. The memory circuitry contains instructions executable by the processing circuitry such that the analytics system is configured to perform a high-altitude overshoot detection procedure and a terrestrial overshoot detection procedure. The analytics system is further configured to detect a plurality of overshooting events occurring within a communication network. Each overshooting event is detected by either the high-altitude overshoot detection procedure or the terrestrial overshoot detection procedure. The analytics system is further configured to, responsive to a base station within the communication network being associated with more than a threshold number of the overshooting events, configure the base station to use a previous antenna tilt that produced overshooting events at a lower rate relative to a current antenna tilt of the base station.

In some embodiments, the analytics system is further configured to perform any of the methods described above.

Yet other embodiments include a computer program comprising instructions that, when executed on processing circuitry of an analytics system, cause the processing circuitry to carry out any of the methods described above.

Yet other embodiments include a carrier containing such a computer program. The carrier is one of an electronic signal, optical signal, radio signal, or computer readable storage medium.

Further embodiments are detailed further in the detailed description below and in the accompanying drawings.

BRIEF DESCRIPTION OF THE DRAWINGS

Aspects of the present disclosure are illustrated by way of example and are not limited by the accompanying figures with like references indicating like elements. In general, the use of a reference numeral should be regarded as referring to the depicted subject matter according to one or more embodiments, whereas discussion of a specific instance of an illustrated element will append a letter designation thereto (e.g., discussion of a base station 25, generally, as opposed to discussion of particular instances of base stations 25*a*, 25*b*, 25*c*, 25*d*).

DETAILED DESCRIPTION

Figure 1:
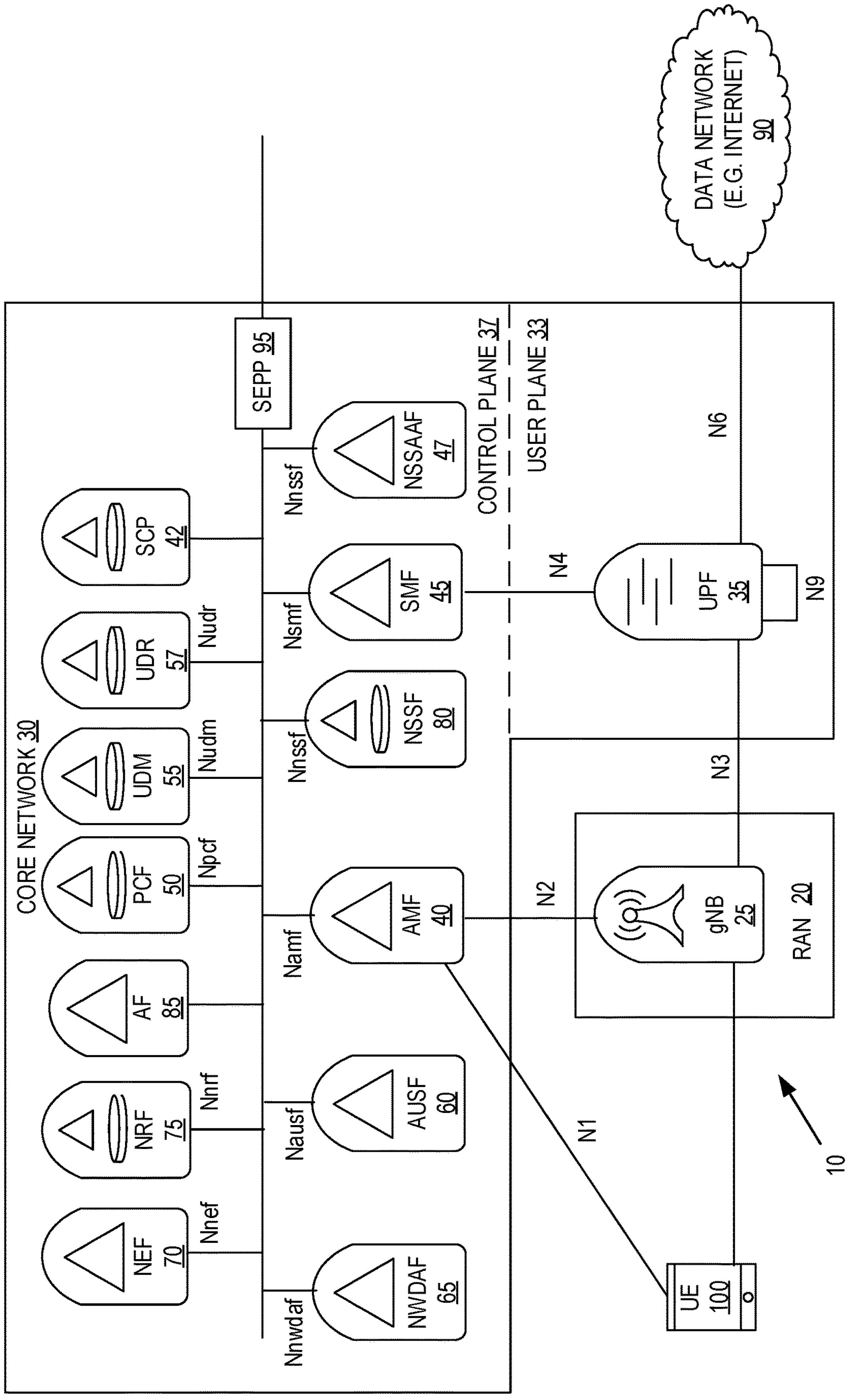
FIG. 1 is a schematic block diagram illustrating an example communication network, according to one or more embodiments of the present disclosure.

Developing radio optimization solutions for aerial UEs is uniquely challenging. One of the main difficulties in supporting radio optimization for aerial systems involves handling the interference caused by the increased number of non-serving cells having line-of-sight paths to aerial UEs. A basic way to address overshoot for aerial UEs may include manual overshoot detection procedures. A more sophisticated solution may include an automated overshoot detection solution based on a static threshold. For example, a static threshold may be calculated based on the average/mean distance between sites.

Traditional approaches that have used static thresholds have historically applied this threshold to the entire radio network. However, site-to-site distances can greatly vary in typical network deployments. In more dense areas having smaller site-to-site distances, these traditional approaches often fail to detect overshooting cells because the threshold is set too high. On the other hand, traditional approaches will often falsely detect overshooting in rural areas having higher site-to-site distances because the threshold is too low. Attempts to improve on these static thresholds include approaches that calculate the threshold based on the number of neighbors that could limit the accuracy of the surrounding area-specific threshold. Yet other approaches apply methods that depend on active measurements of UEs. Notwithstanding, these approaches often perform poorly in practice.

It has not historically been clear that traditional approaches could be readily improved using more modern techniques. For example, building on various machine learning methods to tune the network more accurately may impair the ability of humans to interpret certain scenarios being considered, thereby calling into question the trustworthiness of results produced by such solutions.

Among other things, solutions are proposed herein for providing a preventive way to detect, report, and/or resolve overshooting cells both at the ground level and at high altitudes in a closed loop and automated way. As will be discussed below, particular embodiments provide a workflow for identifying overshooting cells at high-altitudes based on drone UE interference reports, as well as overshooting cells based on an adaptive threshold calculated from the surrounding area-specific site-to-site distances of particular cell sites. In some embodiments, high-altitude overshoot detection is based on collecting statistics on the interference reports in an analytics system used for identifying antenna direction and antenna azimuth pairs with frequent interference.

The adaptive threshold for ground interference detection may be populated from an area-specific site-to-site distance by multiplying a site-to-site distance range-specific multiplier parameter (which may be configurable, in some embodiments). Using that adaptive threshold for decision-making may eliminate both missed results and false positives. In some embodiments the system is additionally capable of reporting certain data quality issues in case a scenario is not interpretable to a human in a meaningful way; e.g., when measured distances are not compatible with the relevant expected distances due to standards or the physics of radio signal propagation. Such errors may result, e.g., from the use of incorrect geographical coordinates.

Statistics for antenna height, tilt, and azimuth settings may also be collected and, if frequent overshoot detection occurs, these settings may be identified and avoided as part of an automated overshoot solution process. The various embodiments disclosed herein may make use of network analytics systems such as EEA or other network analytics systems that are part of the network management domain.

Particular embodiments will identify and eliminate overshooting cells both at high altitude (typically due to side beams) and on the ground (typically due to the main antenna beam). In some embodiments, statistical data collection based on interference reports generated by UEs (e.g., drones) flying at high altitudes will be used. Embodiments will additionally or alternatively use adaptive thresholds for detecting overshoot at high altitudes. An analytics system may collect statistics of overshooting antenna direction both at the ground and at high altitude.

At least some embodiments will generate concrete antenna tilt directions that can be used to improve network performance. Historical statistical data of the antenna tilt and related overshoot may be monitored and antenna tilt that would cause additional interference may be avoided. As a result of the adaptive threshold calculation described herein, a more meaningful threshold for the cell based on its geographical context is produced. The solution may also detect certain data quality issues if errors in input data cause higher distances than the related radio standards can handle (e.g., due to wrong site geographic coordinates).

The embodiments described herein can work on multiple different type of inputs. One such example input type includes network location (cell) history information of the mobile devices moving in across the network and the related network cell reference data providing the cell locations. Another example input type includes network topology or Configuration Management (CM) information describing the locations and the relations of the cells.

Embodiments may be configured in a variety of ways depending on the embodiment. For example, embodiments may use different algorithms for determining the adaptive thresholds. Embodiments may additionally or alternatively use an upper limit over the adaptive thresholds previously described, which may indicate data quality issues compared to an actual overshooting scenario. Embodiments may additionally or alternatively handle priority configuration between terrestrial and high-altitude overshoot detection and elimination.

Turning now to the figures, FIG. 1 illustrates an example communication network 10 that is consistent with the 3GPP 5G system architecture. The communication network 10 comprises a radio access network (RAN) 20 and a core network 30 employing a service-based architecture. The service-based architecture for the 5G Core (5GC) was defined in 3GPP Release 15, has evolved in Release 16, and may continue to evolve in future releases. That said, although FIG. 1 illustrates a communication network 10 that is consistent with a 5G architecture, it should be noted that embodiments of the present disclosure include networks that comport with other system architectures as well.

The RAN 20 and the core network 30, when operated by the same operator, are sometimes collectively referred to as a Public Land Mobile Network (PLMN). The RAN 20 and core network 30 may alternatively be a Standalone Non-Public Network (SNPN) or Public Mobile Network (PMN), for example. The RAN 20 comprises one or more base stations 25 that are configured to provide radio access to one or more UEs 100 operating within a coverage area of the RAN 20. In the context of certain 5G networks (e.g., as in FIG. 1), a base station 25 may be referred to as a gNodeBs (gNB). The core network 30 provides a connection between the RAN 20 and one or more data networks (DNs) 90, such as the Internet, for example. In this example, the communication network 10 is able to provide a local breakout to the DN 90 for one or more UEs 100. The communication network 10 may additionally or alternatively provide a home-routed user plane to another network (e.g., via the SEPP 95) where a breakout to the DN 90 (or another DN) occurs.

The core network 30 comprises a plurality of network functions (NFs). These NFs may be in either the user plane 33 or the control plane 37 of the core network 30. The user plane 33 (sometimes referred to as the data plane) typically carries user data traffic. The control plane 37 typically carries signaling traffic (e.g., control packets).

In this example, the NFs of the user plane 33 comprise a User Plane Function (UPF) 35. The NFs of the control plane 37 comprise an Access and Mobility Management Function (AMF) 40, a Session Communication Proxy (SCP) 42, a Session Management Function (SMF) 45, a Network Slice Specific Authentication and Authorization Function (NS-SAAF) 47, a Policy Control Function (PCF) 50, a Unified Data Management (UDM) function 55, a Unified Data Repository (UDR) function 57, an Authentication Server function (AUSF) 60, a Network Data Analytics Function (NWDAF) 65, a Network Exposure Function (NEF) 70, a Network Repository Function (NRF) 75, and a Network Slice Selection Function (NSSF) 80. The control plane 37 of the core network 30 also includes an Application Function (AF) 85, and a Security Edge Protection Proxy (SEPP) 95.

The NFs of the core network 30 comprise logical entities that reside in one or more core network nodes, which may be implemented using computing hardware, such as one or more processors, memory, network interfaces, or a combination thereof. The functions may reside in a single core network node or may be distributed among a plurality of core network nodes.

The NFs may communicate with one another using predefined interfaces. Some of the interfaces are referred to by standardized reference points within the network, whereas other interfaces are simply named. N1 is a reference point between a UE 100 and the AMF 40. N2 is a reference point between the RAN 20 and the AMF 40. The N3 is a reference point between the RAN 20 and the UPF 35. N4 is a reference point between the SMF 45 and the UPF 35. N6 is a reference point between the UPF 35 and the DN 90. N9 is a reference point between UPFs 35. Several of the NFs expose a service-based interface named after them in the format Nxxx, wherein xxx is the name of the NF. For example, the NEF 70 provides an Nnef interface, the NRF 75 provides an Nnrf interface, and so on.

The NWDAF 65 is an example of an analytics system. The NWDAF 65 is a 3GPP standard NF that is used to collect data from UEs 100, NFs, Operations, Administration, and Maintenance (OAM) systems, and the like the 5GC, Cloud, and Edge networks for use in analytics. The analytics system may, for example, be powered by EEA. Although the NWDAF 65 is an analytics system in the form of a 3GPP standard NF in the core network 30, other analytics systems may be located elsewhere.

Figure 2:
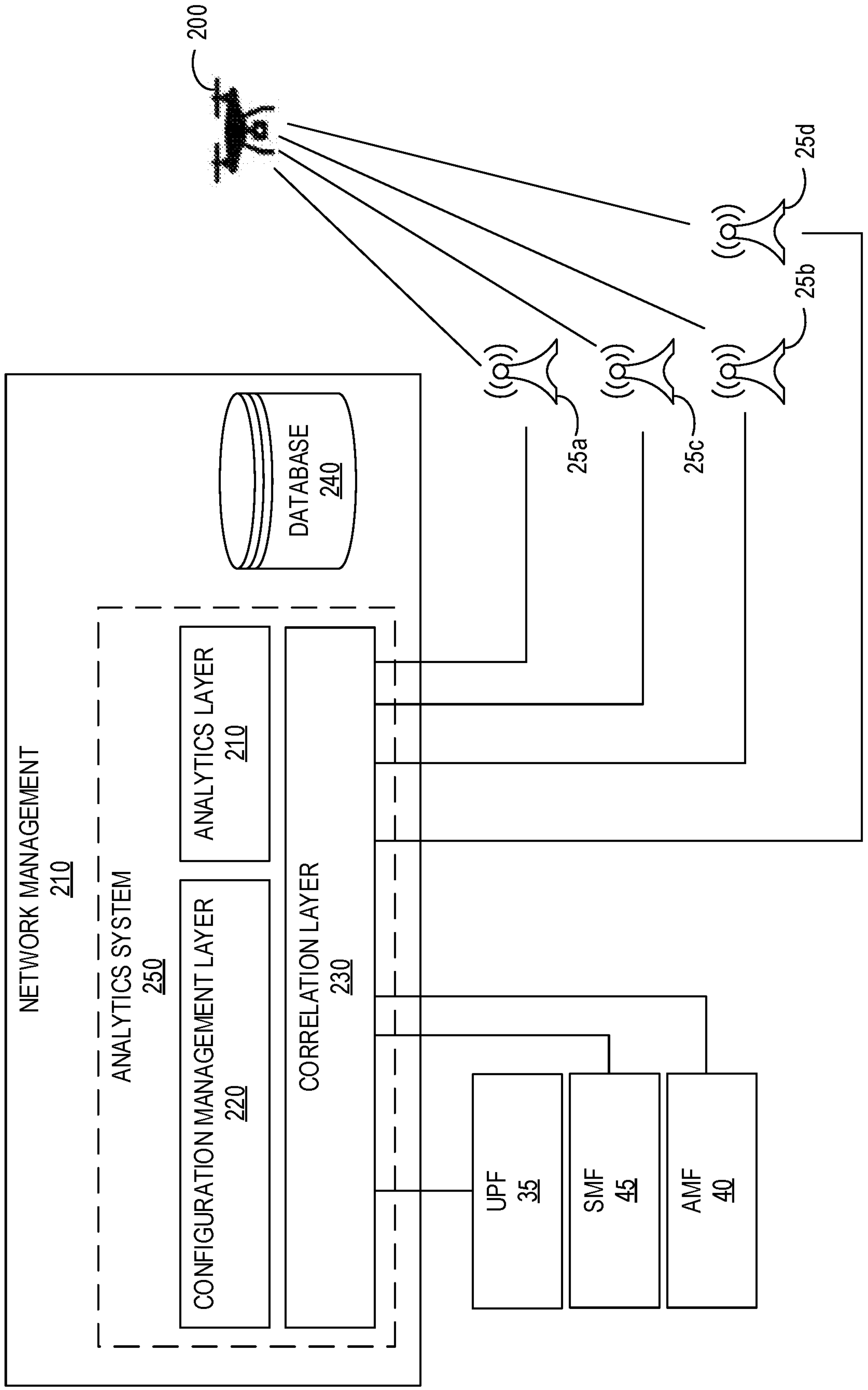
FIG. 2 is a schematic block diagram illustrating an example data collection and overshoot detection framework, according to one or more embodiments of the present disclosure.

FIG. 2 illustrates an example of a functional framework for performing data collection and overshoot detection in accordance with one or more embodiments of the present disclosure. The framework is comprised within the communication network 10 and comprises a network management layer 210. The network management layer 210 comprises a CM layer 220, an analytics layer 210, a correlation layer 230, and a database 240. One, some, or all of the analytics layer 210, CM layer 220, correlation layer 230, and/or the database 240 may be comprised, in whole or in part, within one or more computing devices of an analytics system 250.

The analytics system 250 is configured to collect and correlate relevant node events and KPIs from different sources, e.g., in order to generate per-session records. The sources include one or more radio base stations (RBSs) 25, UPFs 35, AMFs 40, and SMFs 40. In the example of FIG. 2, the analytics system 250 collects information from a UPF 35, an AMF 40, an SMF 40, a base station 25*a* providing a serving cell to an aerial UE 200, neighboring base stations 25*c*, 25*d*, and an overshooting neighboring base station 25*b*. The KPIs collected from these sources may be aggregated for different entities and/or for different time periods. For example, KPIs may be aggregated for one or more cells daily.

The aerial UE 200 is in the active state and connected to a serving cell provided by base station 25*a*. The aerial 200 measures the signal of the serving cell as well as the neighbor cells provided by base stations 25*b-d*. The aerial UE 200 reports these measurements in a cell trace.

Having collected and correlated certain information (e.g., as described above), the analytics system 250 may detect and decide to resolve the overshoot of base station 25*b* and configure new antenna tilt settings in the CM layer 220. The CM layer 220 may synchronize with the base stations 25*a-d* regularly to apply the antenna tilt settings automatically as appropriate. Thus, the analytics system 250 of particular embodiments of the present disclosure may provide high altitude overshoot detection, terrestrial overshoot detection, overshoot resolution, and/or overshoot statistics collection.

Figure 3:
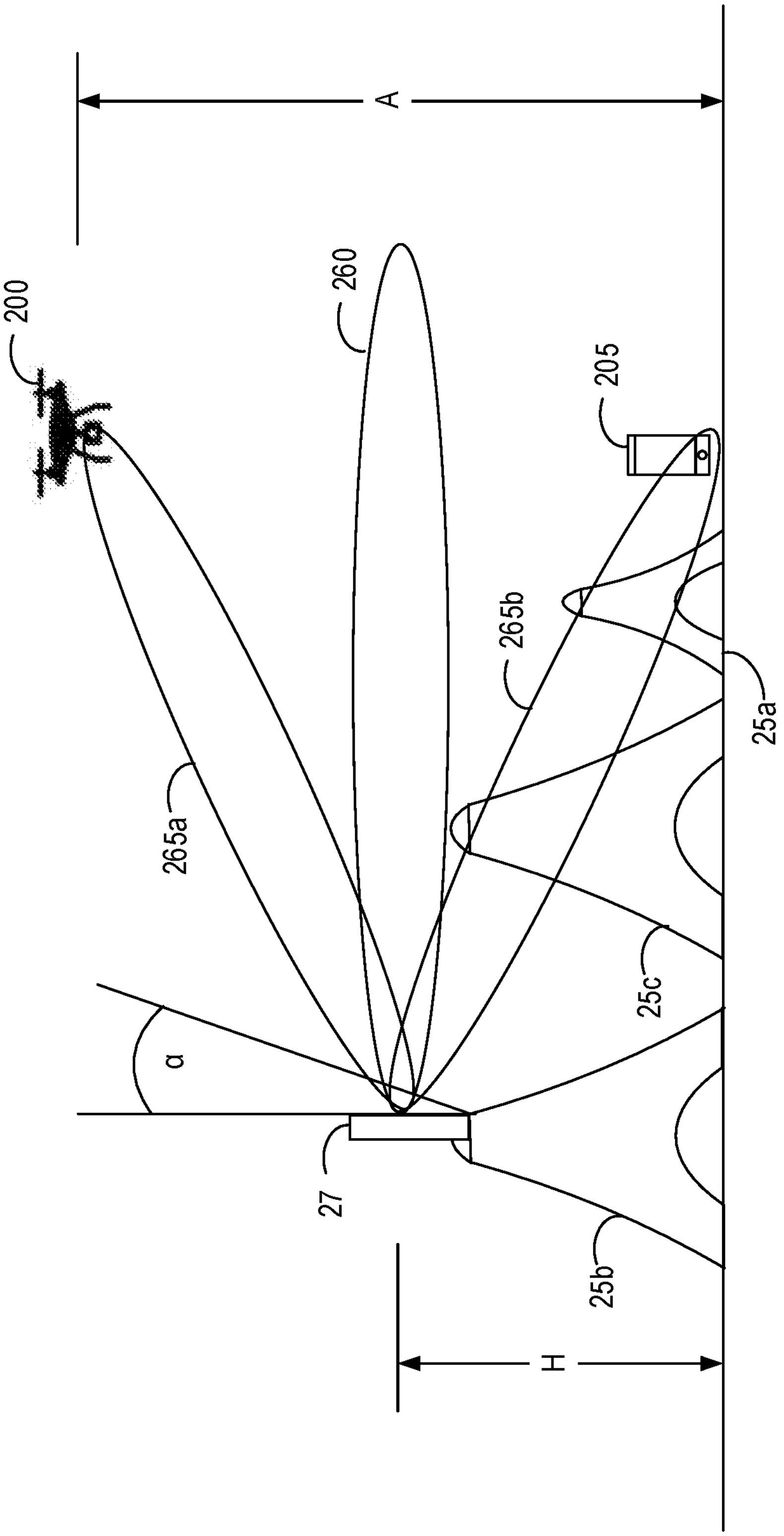
FIG. 3 is a schematic illustrating an example of overshoot at high altitude, according to one or more embodiments of the present disclosure.

FIG. 3 shows an example of overshoot at high altitude due resulting from non-optimal tilt a of an antenna 27 that directs a side beam 265*a* in the direction of an aerial UE 200. In FIG. 3, the overshooting base station 25*b* transmits a main beam 260 above terrestrial level, which results in side beams 265*a*, 265*b*. One of the side beams 265*a* overlaps with an aerial UE 200 flying at an altitude A, which is above a height H of the antenna 27. Another of the side beams 265*b* overlaps with a terrestrial UE 205. The side beams 265*a*, 265*b* overshoot the other base stations 25*a*, 25*c* and create interference for the terrestrial UE 205 and the aerial UE 200.

Figure 4:
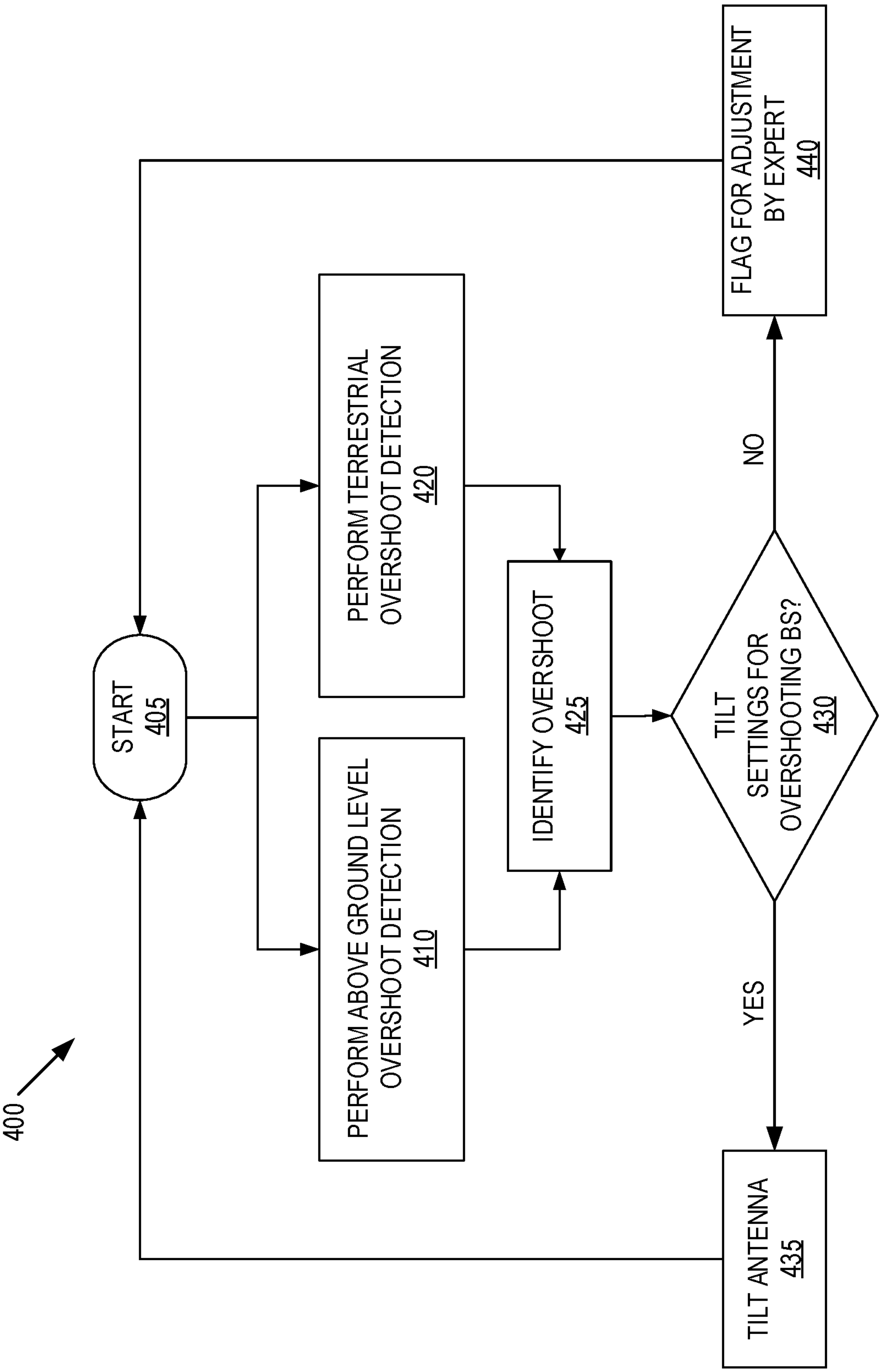
FIG. 4 is a flow diagram illustrating an example method of correcting antenna overshoot, according to one or more embodiments of the present disclosure.

FIG. 4 is a flow diagram of an example high-level method 400 of correcting antenna overshoot, implemented by an analytics system 250, according to one or more embodiments of the present disclosure. The method 400 starts (block 405) by performing AGL overshoot detection (block 410) and performing terrestrial overshoot detection (block 420). The method 400 further comprises identifying overshoot in the communication network 10 based on the AGL and/or terrestrial overshoot detection (block 425). The method 400 further comprises, if the analytics system 250 has tilt settings for the overshooting base station 25*b* (e.g., in the statistics collected by the analytics system 250 from the base stations 25*a-d*, UPF 35, AMF 40, and/or SMF 45) (block 430, yes path), adjusting the tilt settings to tilt the antenna 27 (block 435). If the analytics system 250 does not have tilt settings for the overshooting base station 25*b* (block 430, no path), then the overshooting base station 25*b* is flagged for adjustment by an expert (block 440). In either case, the method may further comprise continuing to perform overshoot detection (i.e., by restarting the method 400 (block 405)).

Figure 5:
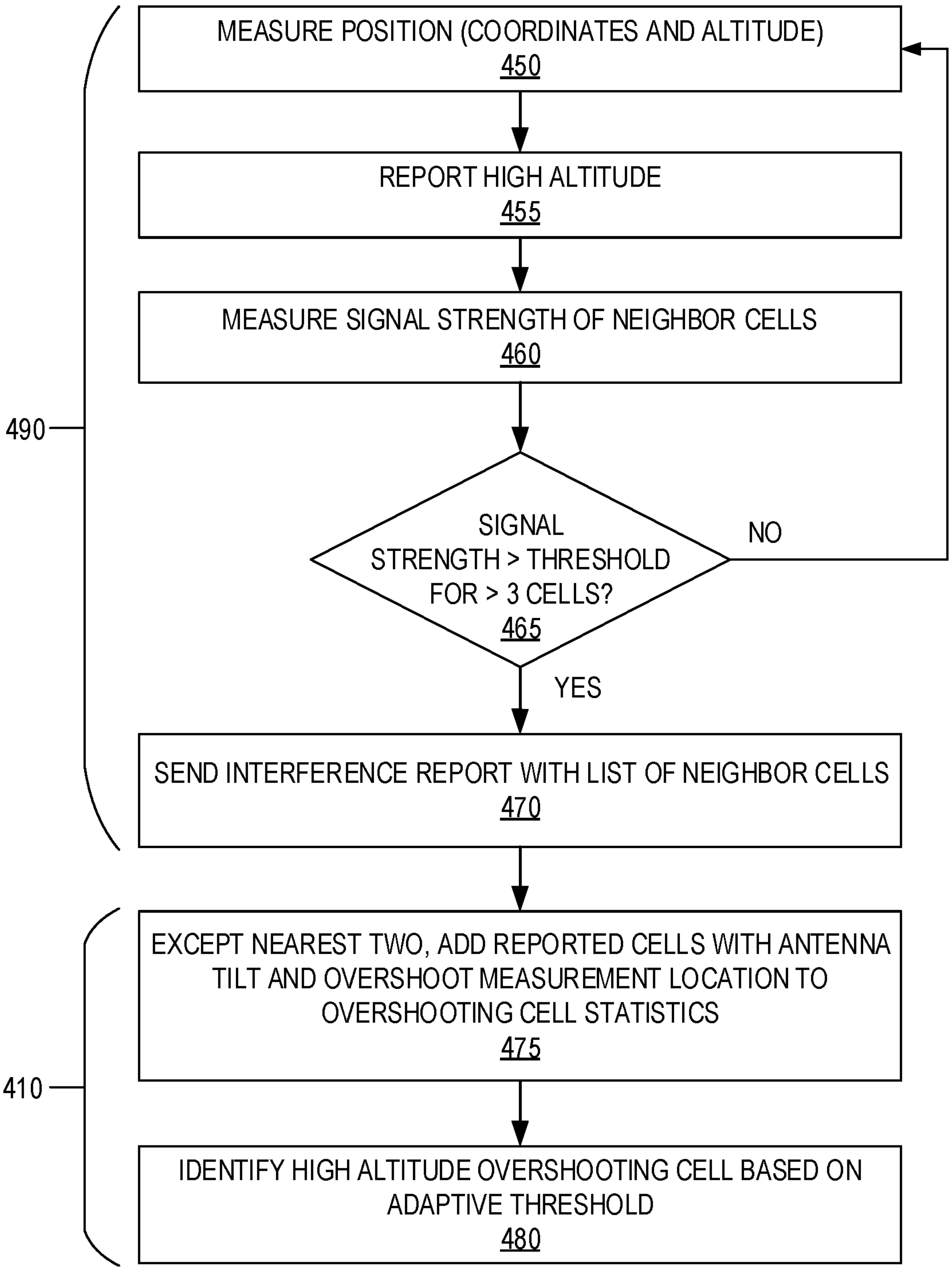
FIG. 5 is a flow diagram illustrating an example method of above ground level overshoot detection, according to one or more embodiments of the present disclosure.

FIG. 5 is a flow diagram illustrating AGL overshoot detection as performed through coordinated actions between an aerial UE 200 and the analytics system 250, according to one or more embodiments of the present disclosure. In FIG. 5, process 490 is implemented by the aerial UE 200, and the previously mentioned block 410 implemented by the analytics system 250 is depicted in greater detail. As shown in this example, the AGL (e.g., high-altitude) overshoot detection of block 410 may be triggered in response to the aerial UE 200 measuring its position (e.g., its coordinates and altitude) (block 450) and reporting that it is at a high altitude (e.g., relative to a threshold as reported in an H1 event of a measurement report from the aerial UE 200) (block 455). The aerial UE 200 may then measure any neighbor cells 25*b*, 25*c*, 25*d* that may be measurable (block 460) and send an interference report identifying the neighbor cells having a signal strength above a threshold together with the measured coordinates in an H2 event (block 470). In this particular example, the aerial UE 200 sends the interference report responsive to detecting that the signal strength of more than three cells is greater than a threshold (block 465, yes path). Had the signal strength been above the threshold for fewer (e.g., none) of the measured cells, the aerial UE may have restarted the measuring and detecting process (block 465, no path).

These interference report may be captured by the analytics system 250 and used to perform AGL overshoot detection (process 410). In this example, the high-altitude overshoot detection function of the analytics system 250 may obtain the coordinates of the base stations indicated in the interference report from reference or configuration data and calculate the distance between the base stations of the reported neighbor cells and the three-dimensional aerial UE position. The analytics system 250 may also calculate the direction of the aerial UE 200 relative to the serving base station 25*a*. In this example, the analytics system 250 removes the closest n (e.g., n=2 or 3) reported neighbor cells and adds any remaining cell-direction pairs to the overshoot statistics (block 475). Location may be recorded with a reasonable resolution (generally, 10-100 meters). The direction may be recorded with the resolution of the solid angle related to the position accuracy. The antenna tilt (a in FIG. 3) may also be stored. The analytics system 250 may then identify one or more high altitude overshooting cells based on an adaptive threshold, as will be explained in further detail below (block 480).

Returning to FIG. 4, it should be noted that, in parallel to the AGL overshoot detection of block 410, the terrestrial overshoot detection of block 420 may also be performed based on an adaptive threshold to identify one or more overshooting cells serving terrestrial UEs 205 and the terrestrial overshooting direction. As a result, one or more antennas 27 and their corresponding directions may be added to the overshoot statistics stored in the database 240. In some such embodiments, if the frequency in which an antenna-direction pair is represented in the overshoot statistics exceeds a threshold, the overshoot resolution function may be triggered, which tilts the corresponding antenna in the overshoot direction (block 435). This step may be executed automatically or only in response to certain conditions, depending on the embodiment. For example, automatic overshoot resolution may be triggered responsive to an overshoot frequency of a different antenna tilt angle being less frequent. In other words, if the analytics system 250 has statistics that indicate that a different antenna tilt angle would produce less frequent overshoot results, automatic overshoot resolution may be triggered. That said, if the overshoot cannot be resolved by this automated process, expert or more advanced radio optimization may be needed and performed by another process as appropriate (block 440).

Figure 6:
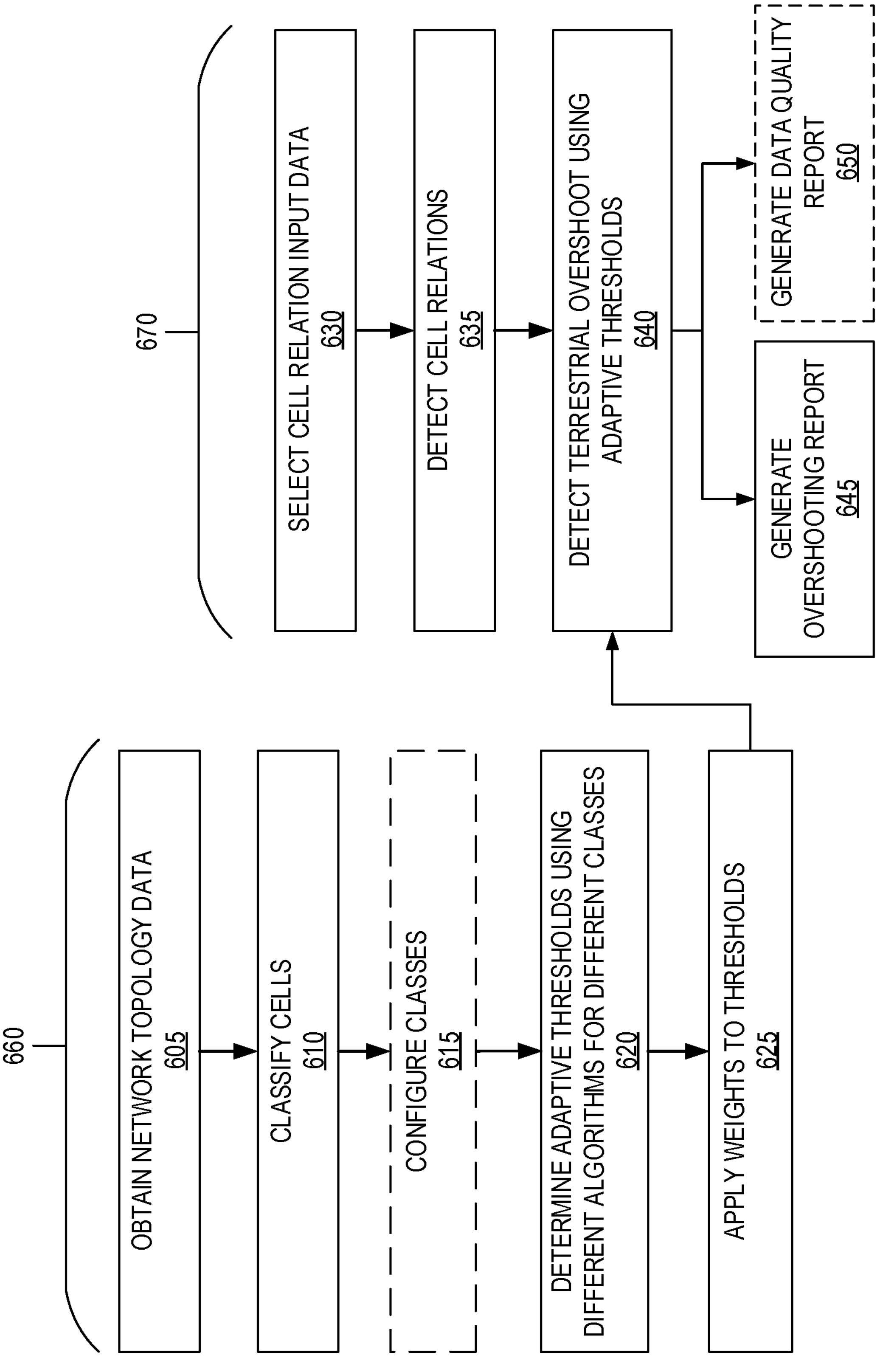
FIG. 6 is a flow diagram illustrating an example method of calculating an adaptive threshold and the use thereof in terrestrial overshoot detection, according to one or more embodiments of the present disclosure.

FIG. 6 is a flowchart illustrating the calculation of an adaptive threshold (section 660) and the use thereof in terrestrial overshoot detection (section 670), according to one or more embodiments. In general, different inputs may be used to calculate the adaptive threshold and as a source for comparison in detecting overshoot. The adaptive thresholds may be calculated and adjusted by the analytics system 250 for every cell in the RAN 20 and compared with input for detecting such overshoot. This threshold calculation may be triggered by events or according to a regular period, e.g., weekly. Further, reporting of the overshooting cells may be triggered independently of the threshold calculation such that they may occur on a timeframe that is either the same or different (e.g., daily), depending on the embodiment.

The analytics system 250 obtains data about the network topology that will serve as an input for the adaptive threshold calculation (block 605). This data may come from a variety of sources and take a variety of forms, depending on the embodiment. For example, the inputs for calculating the adaptive threshold may include, for example, network (e.g., cell) reference data to identify relationships between cells. These inputs may include, for example, a reference table of cell-site locations (e.g., World Geodetic System (WGS) coordinates including longitude and latitude).

Detection based on the adaptive threshold may use one or more other inputs to identify handover events (block 630). These inputs may include, for example, a cell history of visited cells across the end user's service session (e.g., location history records where the UE 100 of a given user has moved for a service, such as Mobile Broadband (MBB) data or Voice over Long Term Evolution (VOLTE)). In particular, the analytics system 250 may calculate the distances between two consecutive cell's coordinates and compare that to the adaptive threshold calculated for the first cell. In this way, embodiments may consider the consecutive locations where handover or cell reselection was successful and in which the cells were operating on the same carrier frequency.

The inputs for detection based on the adaptive threshold may additionally or alternatively include configuration management X2 and/or Neighbor Cell Relation definitions. For example, the analytics system 250 may calculate the distance between sites identified in such definitions and compare the distance to the adaptive overshooting threshold. If the calculated distance is higher than the adaptive overshooting threshold, the analytics system 250 may report the cells as overshooters. Alternatively, the target cell of a source-target pair of cells may be reported as the overshooter and the source cell may be reported as an interfering cell. Problem Management (PM) counters for the detected relations may be used as weights to rank the overshooters according to their negative impact, with problems in cells of a detected relation that have higher numbers of handover attempts being deemed to have a more negative impact on end users, for example.

The inputs for detection based on the adaptive threshold may additionally or alternatively include a detailed cell trace record that includes periodic measurement reports for neighboring cells, as measured by UEs 100. This input may give the most precise results as such measurement can also provide the exact signal conditions for further refinement or data quality checks.

The adaptive threshold may be calculated using a variety of techniques, depending on the embodiment. In some embodiments, the analytics system 250 creates an adjacency graph from the topology of the network as represented in CM data. A rule may then be used to identify overshooting cells. Such a rule may, e.g., be that overshooting exists when the radius is at least two when the following equation is applied:

$$r = \min_{v \in V} \min_{u \in V} d(u, v) \tag{1}$$

wherein r denotes radius, V denotes the adjacency graph, and u and v each denote cells in the adjacency graph.

Figure 7:
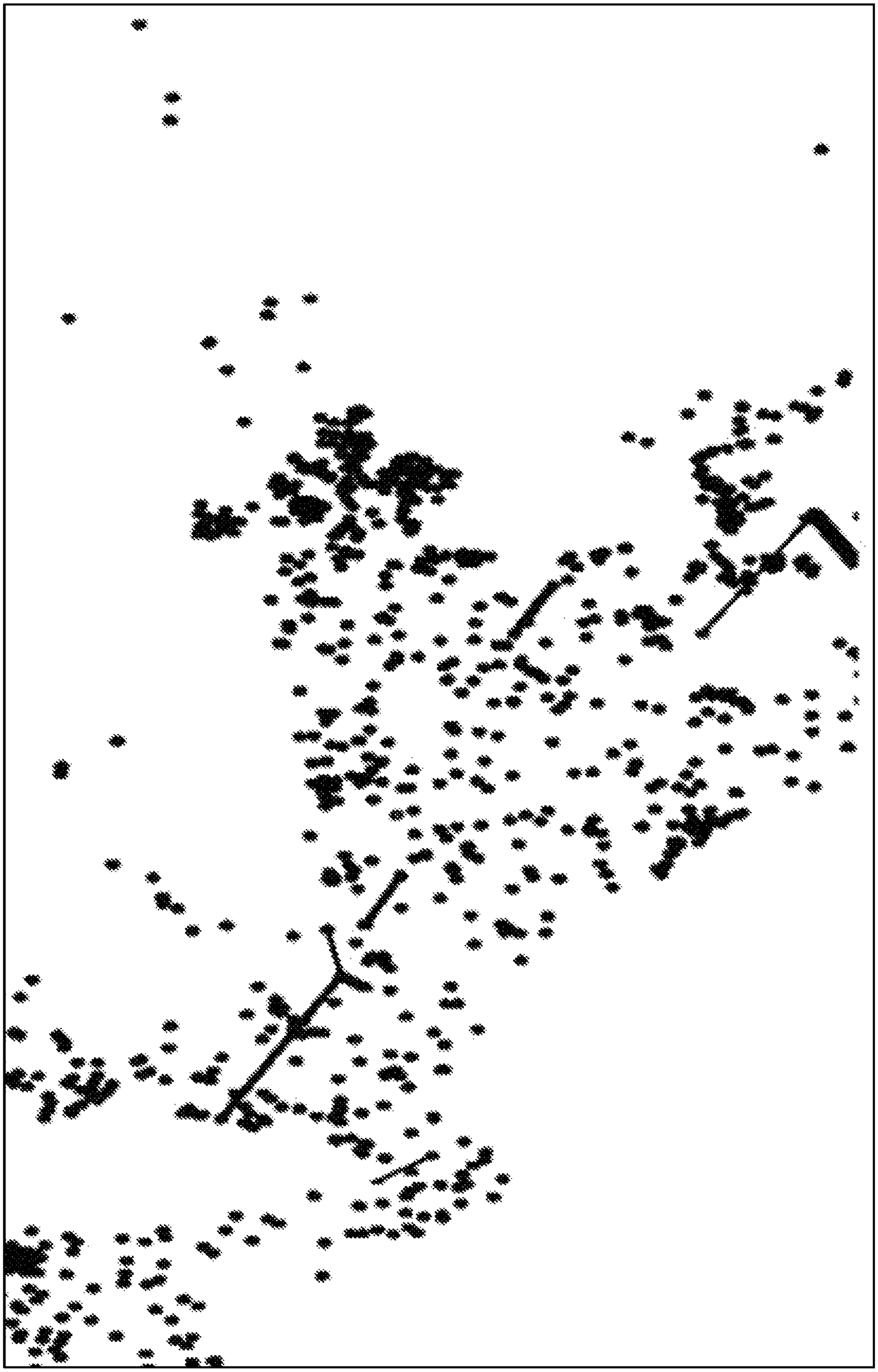
FIG. 7 is a graph illustrating an example network topology, according to one or more embodiments of the present disclosure.

FIG. 7 illustrates a graph illustrating an example of a network topology in which dots are used to represent cells and solid lines are used to connect overshooting cell pairs. As shown in FIG. 7, some cells may be more densely packed whereas others may be less densely packed. Embodiments of the present disclosure may consider cells to be neighbors adaptively based on the local density of the sites.

Returning to FIG. 6, a density-based clustering method (e.g., DBSCAN, HDBSCAN, OPTICS) may be used to segment cells (block 610). The segmentation may be based on a variety of factors depending on the embodiment. For example, the cells may be segmented based on their geographical density, e.g., to separate less dense areas from more dense areas. Additionally or alternatively, the cells may separate cells near roads from cells in cities, for example. Embodiments may additionally or alternatively include outlier filtering.

Each resulting cluster (e.g., of a less dense area) may be labeled, e.g., according to their type. This labeling can be generalized as $f_c(x)=y$, $x \in C$, $y \in \{0, 1, \ldots, n\}$, wherein C denotes the set of cells in the network, and the network includes n+1 types of cells.

The analytics system 250 may configure the classes into a desired number of classes, e.g., by merging or dividing classes (block 615). For example, the analytics system 250 may merge the different clusters into fewer classes based on their densities. In some embodiments, this step is important to optimize processing so that more optimal thresholds for the resulting classes of cells may be obtained.

As an example, the analytics system 250 may configure two classes of cells. For purposes of this example, the two classes are inliers (i.e., cells in a dense area) and outliers (i.e., cells outside of dense areas). These classes of cells may then be processed separately, possibly even with two different algorithms to determine adaptive thresholds for each (block 620). Indeed, embodiments of the present disclosure include running different algorithms for n different classifications of cells to determine respective adaptive thresholds.

Continuing with the example, for one class (e.g., the inliers) the analytics system 250 may apply a simple k-nearest neighbor (NN) or adaptive k-NN algorithm (e.g., wherein k is based on the size of the cluster) to determine site-to-site distances within the clusters, then use an average or median of the first k site-to-site distances for each inlier cell to determine the threshold for the inlier class.

For the outlier class, the analytics system 250 may separately run a k-NN algorithm with a single-linkage distance (i.e., the shortest distance between a cell in the cluster and a cell in another cluster) and between outliers within a cluster. The single-linkage distance may be given by the formula:

$$D(x, Y) = \min_{y \in Y} d(x, y) \tag{2}$$

The distance between outliers may be given by the formula:

$$D(x, y) = \min_{x, y \in O} d(x, y) \tag{3}$$

where O denotes the set of outliers. This approach may provide further information regarding cell position with respect to their nearest clusters (e.g., the nearest city to an outlier). In such embodiments, the analytics system 250 may take the average, the median, or the second nearest neighbor's distance (e.g., after sorting the determined distances) for any outlier cell of interest.

Once a specific site-to-site (s2s) distance has been assigned to a cell site (e.g., to every cell site in a cluster), the analytics system 250 may compute the adaptive overshooting thresholds for each cell based on preconfigured ranges and, in some embodiments, multipliers (i.e., weights) according to the ranges (block 625). An example is provided by the following rule set, using the general formula overshoot_threshold=s2s_distance*multiplier.

- If s2s_distance<500 meters: overshoot_threshold=s2s_distance*multiplier_dense.
- If s2s_distance 500-3000 meters: overshoot_threshold=s2s_distance*multiplier_urban.
- If s2s_distance>3000 meters: overshoot_threshold=s2s_distance*multiplier_rural In this regard, the dense, urban, and rural multipliers may be, e.g., 4, 3, and 2.5, respectively, for example. These parameters may be adjust as needed to obtain improved results.

Once the adaptive overshooting threshold is calculated per cell (i.e., such that the same overshooting threshold may be used for each cell neighboring the same cell site) then automated overshooting detection using the adaptive overshooting threshold is enabled. In such embodiments in which detection is based on the subscribers' movement-based cell location history, overshooting detection may picks items from the location history list in chronological order and calculates the distance between the current location cell site coordinates and the previous location cell site coordinates (block 635), then compare that calculated distance to the adaptive overshooting threshold of the previous location's cell. If the jump was bigger than the adaptive threshold of the originating cell, than the handover of the device should have crossed over closer cells. Accordingly, such an event is detected as overshooting (block 640).

In such embodiments that use Configuration Management X2 and/or Neighbor Cell Relation definitions as input, the analytics system 250 may calculate the distance of the two sites in each definition and compare this distance to the adaptive overshooting threshold. If the calculated distance is higher than the adaptive overshooting threshold, the analytics system 250 reports the cell pair as a serving-overshooter pair. That is, in cell relation definitions, a source cell and a target cell are specified. Thus, the target cell is reported as an overshooter and the source cell (i.e., the serving cell) is the interfering cell. PM counters for the detected relations may be used as weights to rank overshooters according to their negative impact, with relations having a higher number of handover attempts having a more negative impact on the end users.

In embodiments that use a detailed cell trace record as input (including, e.g., periodic measurement reports of neighboring cells as measured by UEs 100), the procedure may be similar to when using the subscribers' movement based cell location history discussed above. That is, the analytics system 250 may pick items in chronological order from the detailed cell trace record per UE 100 and calculate the distance between the current location cell site coordinates and the previous location cell site coordinates. This distance may then be compared to the adaptive overshooting threshold of the previous location's cell. It is expected that the use of a detailed cell trace record may produce the most precise results of those described herein, as such measurements can also provide exact signal conditions for further refinement or data quality checks as enriched input.

Having analyzed the network for an overshoot condition, the analytics system 250 may provide a report on cells within the network 10 processed for a configured period time period (e.g., a calendar day, a week). This report may, for example, include information on one or more overshooting cells (block 645). This information may include, for example, an identifier of an originating cell (sometimes alternatively referred to as a source cell or a serving cell), an identifier of a target cell (sometimes alternatively referred to as an overshooting cell or an interfering cell), and/or a count of overshooting occasions during the time period of the report. The information in the report may additionally or alternatively include a ranking, ordering, and/or metric representing the extent to which overshooting interference negatively impacted subscribers within the network (e.g., with greater number of occurrences resulting in a bigger negative impact).

The report may additionally or alternatively include the carrier frequency for the cells involved, one or more attributes of the antenna(s) involved (e.g., type, characteristics), tilt (e.g., electrical and/or mechanical), antenna height, a timestamp identifying the relevant reporting period, network reference data matched to the identifiers of the originating and/or target cells, and/or information on a participating further network element or device for the relevant session (e.g., a vendor of the mobile device involved in an overshooting scenario).

Further still, the report may additionally or alternatively include an anomaly detection log, e.g., to determine whether the network's overshoot ratio is outperforming a vendor or competitor's overshoot ratio. To determine relative performance in this regard, a t-test may be used against data obtained by virtue of the analytics system 250 to extrapolate a result that can be compared to corresponding statistics of a target system.

In yet further embodiments, the analytics system 250 may provide another report that identifies where distances measured between locations were beyond a reasonable threshold and/or were not applicable for some reason (e.g., distances that are beyond a physically reasonable distance provided by the related LTE, 5G, or other radio standards) (block 650).

Figure 8:
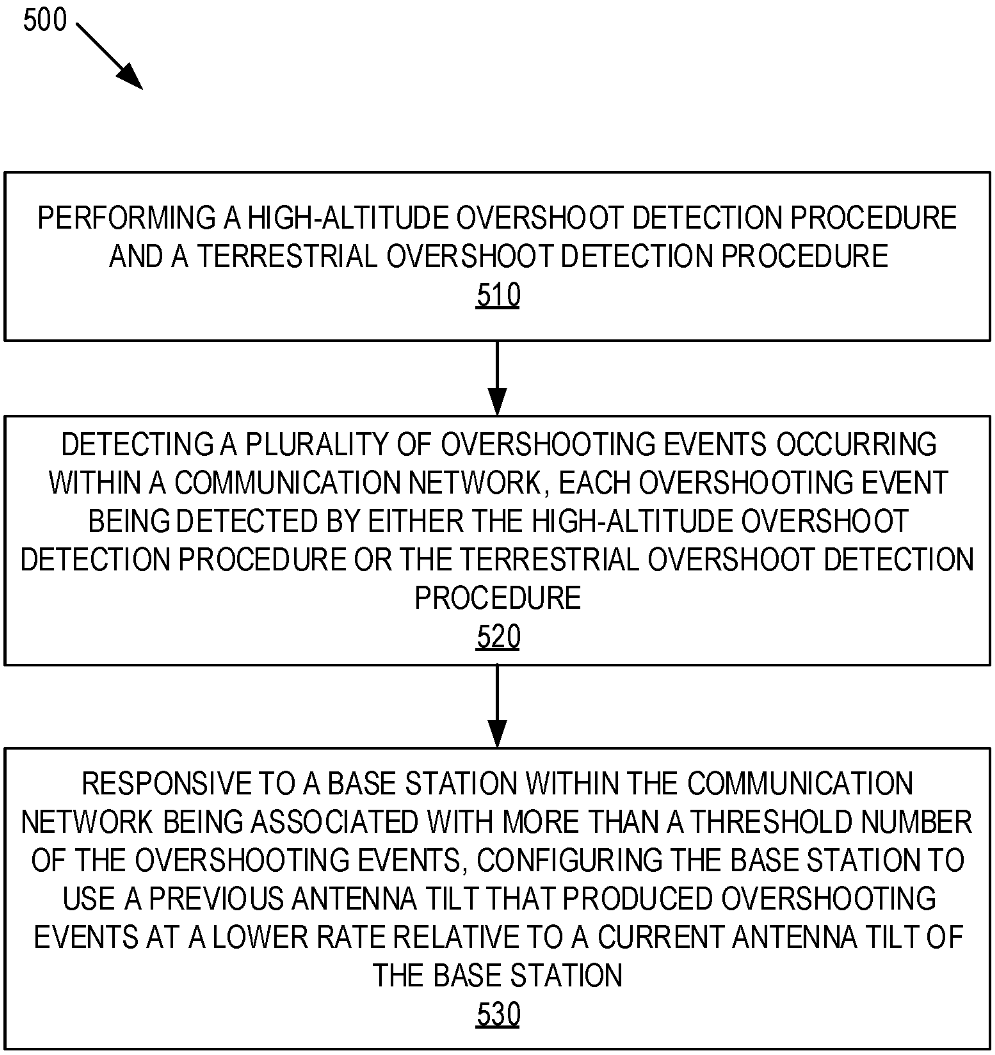
FIG. 8 is a flow diagram illustrating an example of a method performed by an analytics system, according to one or more embodiments of the present disclosure.

In view of the above, FIG. 8 is a flow diagram illustrating an example method 500 implemented by an analytics system 250. The method 500 comprises performing a high-altitude overshoot detection procedure and a terrestrial overshoot detection procedure (block 510). The method 500 further comprises detecting a plurality of overshooting events occurring within a communication network 10, each overshooting event being detected by either the high-altitude overshoot detection procedure or the terrestrial overshoot detection procedure (block 520). The method 500 further comprises, responsive to a base station **25*b* within the communication network 10 being associated with more than a threshold number of the overshooting events, configuring the base station 25*b* to use a previous antenna tilt that produced overshooting events at a lower rate relative to a current antenna tilt of the base station 25*b* (block 530**).

Figure 9:
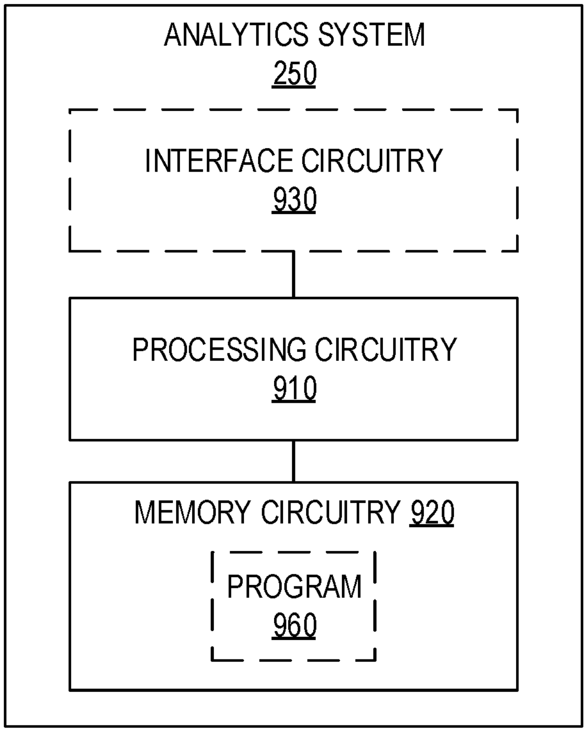
FIG. 9 is a schematic block diagram illustrating an example analytics system, according to one or more embodiments of the present disclosure.

Other embodiments of the present disclosure include the analytics system 250 implemented according to the hardware illustrated in FIG. 9. The example hardware of FIG. 9 may be disposed in any number of distinct computing devices, e.g., in a standalone computer or across a plurality of computing units that form a distributed computing system. The hardware of the analytics system 250 comprises processing circuitry 910, memory circuitry 920, and interface circuitry 930. The processing circuitry 910 is communicatively coupled to the memory circuitry 920 and the interface circuitry 930, e.g., via one or more buses. The processing circuitry 910 may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry 910 may be programmable hardware capable of executing software instructions stored, e.g., as a machine-readable computer program 960 in the memory circuitry 920. The memory circuitry 920 of the various embodiments may comprise any non-transitory machine-readable media known in the art or that may be developed, whether volatile or non-volatile, including but not limited to solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, wholly or in any combination.

The interface circuitry 930 may be a controller hub configured to control the input and output (I/O) data paths of the analytics system 250. Such I/O data paths may include data paths for exchanging signals over a communication network 10. The I/O data paths may additionally or alternatively include data paths for exchanging signals with a user device and/or peripheral device. For example, the interface circuitry 930 may comprise a transceiver configured to send and receive communication signals over one or more of a wireless network, an Ethernet network, and/or an optical network.

The interface circuitry 930 may be implemented as a unitary physical component, or as a plurality of physical components that are contiguously or separately arranged (any of which may be communicatively coupled to any other), or may communicate with any other via the processing circuitry 910. For example, the interface circuitry 930 may comprise output circuitry (e.g., transmitter circuitry configured to send communication signals over the communications network 10) and input circuitry (e.g., receiver circuitry configured to receive communication signals over the communication network 10). Similarly, the output circuitry may comprise a display, whereas the input circuitry may comprise a keyboard. Other examples, permutations, and arrangements of the above and their equivalents will be readily apparent to those of ordinary skill.

According to embodiments of the hardware illustrated in FIG. 9, the processing circuitry 910 is configured to perform a high-altitude overshoot detection procedure and a terrestrial overshoot detection procedure. The processing circuitry 910 is further configured to detect a plurality of overshooting events occurring within a communication network 10. Each overshooting event is detected by either the high-altitude overshoot detection procedure or the terrestrial overshoot detection procedure. The processing circuitry 910 is further configured to, responsive to a base station **25*b* within the communication network 10 being associated with more than a threshold number of the overshooting events, configuring the base station 25*b* to use a previous antenna tilt that produced overshooting events at a lower rate relative to a current antenna tilt of the base station 25*b***.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, implemented by an analytics system, the method comprising:

performing a high-altitude overshoot detection procedure and a terrestrial overshoot detection procedure;

detecting a plurality of overshooting events occurring within a communication network, each overshooting event being detected by either the high-altitude overshoot detection procedure or the terrestrial overshoot detection procedure; and responsive to a base station within the communication network being associated with more than a threshold number of the overshooting events, configuring the base station to use a previous antenna tilt that produced overshooting events at a lower rate relative to a current antenna tilt of the base station.

2. The method of claim 1, wherein:

performing the terrestrial overshoot detection procedure comprises calculating a distance threshold based on a site-to-site distance between the base station and each of a plurality of other base stations neighboring the base station;

detecting the plurality of overshooting events comprises detecting, by the terrestrial overshooting procedure, an overshooting event associated with the base station; and detecting, by the terrestrial overshooting procedure, the overshooting event associated with the base station comprises detecting that a user equipment has performed a handover from the base station in excess of the distance threshold.

3. The method of claim 2, wherein calculating the distance threshold comprises applying a weighting factor to the site-to-site distances based on a geographic density of the base station and the other base stations.

4. The method of claim 2, wherein calculating the distance threshold comprises calculating an average or mean of the site-to-site distances.

5. The method of claim 4, wherein calculating the distance threshold further comprises calculating the distance threshold further based on a single-linkage distance between an outlier base station cluster and another base station cluster, the outlier base station cluster comprising the base station and the other base stations.

6. The method of claim 4, further comprising generating an error report indicating a problem with one or more of the site-to-site distances.

7. The method of claim 2, wherein:

detecting the plurality of overshooting events comprises detecting, by the high-altitude overshoot detection procedure, an overshooting event associated with the base station;

detecting, by the high-altitude overshoot detection procedure, the overshooting event associated with the base station comprises receiving a measurement report from an aerial user equipment that has exceeded a height threshold configured by the communication network; and the measurement report indicates a position of the aerial user equipment and a plurality of base stations detected by the aerial user equipment at the position, the base station being comprised in the plurality of base stations and being farther from the aerial user equipment than at least two other of the base stations.

8. The method of claim 7, wherein detecting, by the high-altitude overshoot detection procedure, the overshooting event associated with the base station further comprises determining from a base station location database that the base station is farther from the aerial user equipment than the at least two other base stations.

9. The method of claim 7, wherein:

detecting the plurality of overshooting events comprises detecting, by the high-altitude overshoot detection procedure, a further overshooting event associated with a further base station comprised in the plurality of base stations indicated by the measurement report; and detecting, by the high-altitude overshoot detection procedure, the further overshooting event associated with the further base station comprises determining that the further base station is farther from the aerial user equipment than the at least two other base stations.

10. The method of claim 1, wherein calculating the distance threshold comprises calculating an average or mean of the site-to-site distances.

11. The method of claim 10, wherein calculating the distance threshold further comprises calculating the distance threshold further based on a single-linkage distance between an outlier base station cluster and another base station cluster, the outlier base station cluster comprising the base station and the other base stations.

12. The method of claim 10, further comprising generating an error report indicating a problem with one or more of the site-to-site distances.

13. The method of claim 1, wherein:

detecting the plurality of overshooting events comprises detecting, by the high-altitude overshoot detection procedure, an overshooting event associated with the base station;

detecting, by the high-altitude overshoot detection procedure, the overshooting event associated with the base station comprises receiving a measurement report from an aerial user equipment that has exceeded a height threshold configured by the communication network; and the measurement report indicates a position of the aerial user equipment and a plurality of base stations detected by the aerial user equipment at the position, the base station being comprised in the plurality of base stations and being farther from the aerial user equipment than at least two other of the base stations.

14. The method of claim 13, wherein detecting, by the high-altitude overshoot detection procedure, the overshooting event associated with the base station further comprises determining from a base station location database that the base station is farther from the aerial user equipment than the at least two other base stations.

15. The method of claim 13, wherein:

detecting the plurality of overshooting events comprises detecting, by the high-altitude overshoot detection procedure, a further overshooting event associated with a further base station comprised in the plurality of base stations indicated by the measurement report; and detecting, by the high-altitude overshoot detection procedure, the further overshooting event associated with the further base station comprises determining that the further base station is farther from the aerial user equipment than the at least two other base stations.

16. The method of claim 1, further comprising generating a report identifying base stations causing the overshooting events occurring within the communication network.

17. The method of claim 1, further comprising identifying, from historical data, the previous antenna tilt of the base station that produced the overshooting events associated with the base station at the lower rate.

18. An analytics system comprising:

processing circuitry and memory circuitry, the memory circuitry containing instructions executable by the processing circuitry such that the analytics system is configured to:

perform a high-altitude overshoot detection procedure and a terrestrial overshoot detection procedure;

detect a plurality of overshooting events occurring within a communication network, each overshooting event being detected by either the high-altitude overshoot detection procedure or the terrestrial overshoot detection procedure; and responsive to a base station within the communication network being associated with more than a threshold number of the overshooting events, configure the base station to use a previous antenna tilt that produced overshooting events at a lower rate relative to a current antenna tilt of the base station.

19. The analytics system of claim 18, wherein:

performing the terrestrial overshoot detection procedure comprises calculating a distance threshold based on a site-to-site distance between the base station and each of a plurality of other base stations neighboring the base station;

detecting the plurality of overshooting events comprises detecting, by the terrestrial overshooting procedure, an overshooting event associated with the base station; and detecting, by the terrestrial overshooting procedure, the overshooting event associated with the base station comprises detecting that a user equipment has performed a handover from the base station in excess of the distance threshold.

20. A non-transitory computer storage medium storing a computer program comprising instructions which, when executed on processing circuitry of an analytics system, cause the processing circuitry to perform a method, the method comprising:

performing a high-altitude overshoot detection procedure and a terrestrial overshoot detection procedure;

detecting a plurality of overshooting events occurring within a communication network, each overshooting event being detected by either the high-altitude overshoot detection procedure or the terrestrial overshoot detection procedure; and responsive to a base station within the communication network being associated with more than a threshold number of the overshooting events, configuring the base station to use a previous antenna tilt that produced overshooting events at a lower rate relative to a current antenna tilt of the base station.

* * * * *